United States Patent
Logiudice et al.

(10) Patent No.: US 8,928,297 B2
(45) Date of Patent: Jan. 6, 2015

(54) ĆUK BASED CURRENT SOURCE

(75) Inventors: Andrea Logiudice, Padova (IT); Giorgio Chiozzi, Padova (IT)

(73) Assignee: Infineon Technologies Austria AG, Villach (AT)

(*) Notice: Subject to any disclaimer, the term of this patent is extended or adjusted under 35 U.S.C. 154(b) by 302 days.

(21) Appl. No.: 13/017,659

(22) Filed: Jan. 31, 2011

(65) Prior Publication Data
US 2012/0194164 A1 Aug. 2, 2012

(51) Int. Cl.
*H02M 3/156* (2006.01)
*H02M 3/00* (2006.01)
*H02M 1/00* (2006.01)

(52) U.S. Cl.
CPC ...... *H02M 3/005* (2013.01); *H02M 2001/0009* (2013.01)
USPC .......................................... 323/282; 323/222

(58) Field of Classification Search
USPC ............ 323/222, 282, 283, 284, 285; 363/16, 363/21, 55, 97, 131
See application file for complete search history.

(56) References Cited

U.S. PATENT DOCUMENTS

| | | | |
|---|---|---|---|
| 5,416,387 A * | 5/1995 | Cuk et al. .................. | 315/209 R |
| 5,900,701 A | 5/1999 | Guhilot et al. | |
| 5,991,171 A * | 11/1999 | Cheng ........................ | 363/21.03 |
| 6,034,513 A | 3/2000 | Farrington et al. | |
| 6,674,272 B2 * | 1/2004 | Hwang ........................ | 323/284 |
| 7,782,039 B1 * | 8/2010 | He ................................ | 323/288 |
| 2007/0024251 A1 * | 2/2007 | Wu et al. ........................ | 323/222 |
| 2008/0084721 A1 | 4/2008 | Miramonti et al. | |
| 2008/0224625 A1 | 9/2008 | Greenfeld | |
| 2008/0278123 A1 | 11/2008 | Mehas et al. | |
| 2009/0251934 A1 * | 10/2009 | Shteynberg et al. ............ | 363/81 |

OTHER PUBLICATIONS

Malesani, L., et al., "Performance Optimization of Ćuk Converters by Sliding-Mode Control," IEEE, 1992, pp. 395-402.
Martínez-Salamero, L., et al., "Analysis of a Bidirectional Coupled-Inductor Ćuk Converter Operating in Sliding Mode," IEEE Transactions on Circuits and Systems, Fundamental Theory and Applications, Apr. 1998, pp. 355-363, vol. 45, No. 4.

* cited by examiner

*Primary Examiner* — Gary L Laxton
*Assistant Examiner* — Trinh Dang
(74) *Attorney, Agent, or Firm* — Slater & Matsil, L.L.P.

(57) ABSTRACT

Disclosed is a Ćuk based current source, a control circuit for a Ćuk based current source, and a method for providing a current.

17 Claims, 5 Drawing Sheets

ĆUK BASED CURRENT SOURCE

TECHNICAL FIELD

Embodiments of the present invention relate to a current source, in particular a current source based on a Ćuk converter topology, and to a method for providing a load current.

BACKGROUND

Current sources which are based on a switched-mode converter topology are commonly known. Current sources of this type include at least one inductive storage element, such as a choke, coupled to a load, and a pulse-width modulator. The pulse-width modulator from a constant supply voltage generates a pulse-width modulated (PWM) voltage which is applied to the inductive storage element. In this type of controller, the mean value of a current through the inductive storage element and, therefore, through the load can be adjusted by varying a duty cycle of the PWM voltage.

Producing the PWM voltage applied to the inductive storage element may involve switching processes which cyclically connect a voltage source providing the constant supply voltage to the inductive storage element. These switching processes may cause electromagnetic interferences (EMI). This is, in particular, an issue when there is a long supply line between the voltage source and a controller including the inductive storage element, like in automotive applications in which the voltage source is, for example, a battery and in which controllers can be distributed throughout the car with supply lines of several meters between the controllers and the battery.

There is, therefore, a need to provide a controlled current source in which EMI problems can be prevented or at least reduced.

SUMMARY OF THE INVENTION

A first aspect relates to a controlled current source that includes an input terminal configured to receive an input voltage, an output terminal configured to have a load connected thereto, and a reference terminal configured to have a reference potential applied thereto. A first inductive storage element and a switching element are connected in series. A series circuit with the first inductive storage element and the switching element are connected between the input terminal and the reference terminal. A second inductive storage element and a freewheeling element are connected in series. A series circuit with the second inductive storage element and the freewheeling element are connected between the output terminal and the reference terminal. A capacitive storage element is coupled between the first and second inductive storage element such that the first inductive storage element, the capacitive storage element and the second inductive storage element are connected in series between the input terminal and the output terminal. A first current measurement circuit is configured to measure one of a current through the switching element, through the freewheeling element, or a sum of the currents through the switching element and the free-wheeling element to provide a first current measurement signal which is dependent on the measured current. A control circuit is configured to receive the first current measurement signal and to generate a drive signal for the switching element dependent on the first current measurement signal.

A second aspect relates to a control circuit for a switching element in a controlled current source. The current source includes an input terminal configured to receive an input voltage, an output terminal configured to have a load connected thereto, and a reference terminal configured to have a reference potential applied thereto. A first inductive storage element and a switching element are connected in series. A series circuit with the first inductive storage element and the switching element are connected between the input terminal and the reference terminal. A second inductive storage element and a freewheeling element are connected in series. A series circuit with the second inductive storage element and the freewheeling element are connected between the output terminal and the reference terminal. A capacitive storage element is coupled between the first and second inductive storage element such that the first inductive storage element, the capacitive storage element and the second inductive storage element are connected in series between the input terminal and the output terminal. A first current measurement circuit is configured to measure one of a current through the switching element, through the freewheeling element, or a sum of the currents through the switching element and the free-wheeling element to provide a first current measurement signal which is dependent on the measured current. The control circuit is configured to receive the first current measurement signal and to generate a drive signal for the switching element dependent on the first current measurement signal.

A third aspect relates to a method for providing a load current. An input terminal is configured to receive an input voltage. An output terminal is configured to have a load connected thereto, and a reference terminal is configured to have a reference potential applied thereto. A first inductive storage element and a switching element are connected in series. A series circuit with the first inductive storage element and the switching element are connected between the input terminal and the reference terminal. A second inductive storage element and a freewheeling element are connected in series. A series circuit with the second inductive storage element and the freewheeling element are connected between the output terminal and the reference terminal. A capacitive storage element is coupled between the first and second inductive storage element such that the first inductive storage element, the capacitive storage element and the second inductive storage element are connected in series between the input terminal and the output terminal. A current is measured through the switching element or through the freewheeling element, or a sum of the currents is measured through the switching element and the freewheeling element to provide a first current measurement signal which is dependent on the measured current. A drive signal for the switching element is generated dependent on the first current measurement signal.

BRIEF DESCRIPTION OF THE DRAWINGS

Embodiments will now be explained with reference to the drawings. These drawings serve to illustrate the basic principle so that only those features necessary for understanding the basic principles are illustrated. The drawings are not to scale. Like reference characters denote like features throughout the drawings.

DETAILED DESCRIPTION OF ILLUSTRATIVE EMBODIMENTS

Figure 1:
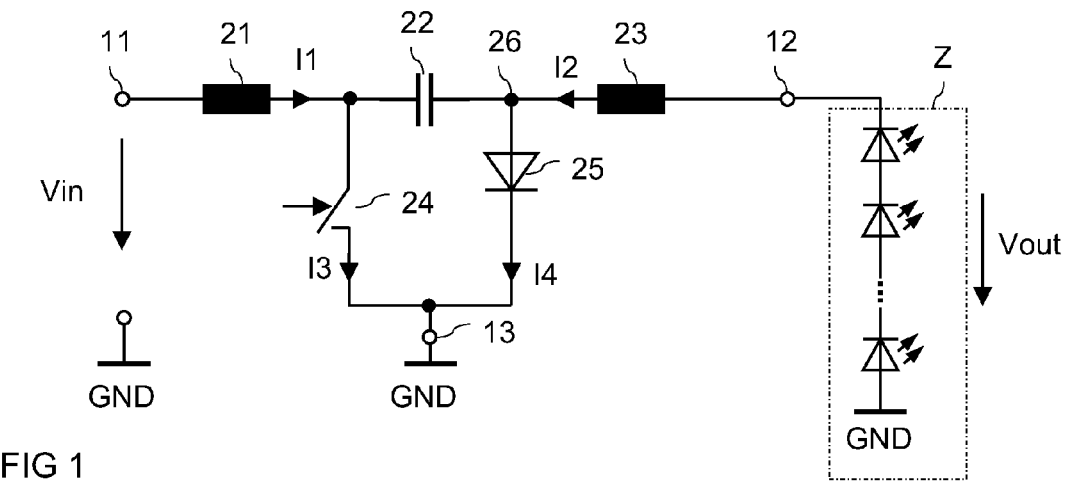
FIG. 1 illustrates a circuit diagram of a current source having a Ćuk converter topology.

FIG. 1 illustrates a current source with a Ćuk converter topology. The current source includes an input terminal 11 configured to receive an input voltage Vin, an output terminal 12 configured to have a load Z (illustrated in dashed lines) connected thereto, and a reference terminal 13 configured to have a reference potential, such as ground, applied thereto. The input voltage Vin is, for example, a voltage relative to the reference potential. The current source further includes a first inductive storage element 21, like a choke, a capacitive storage element 22, like a capacitor, a second inductive storage element 23, like a choke, a controlled switching element 24, and a free-wheeling element 25. The switching element 24 can be implemented as a conventional electronic switch, like a MOSFET, an IGBT, or a bipolar junction transistor (BJT). The free-wheeling element 25 can be implemented as a passive free-wheeling element, like a diode (as shown in FIG. 1), or can be implemented as an active free-wheeling element, like an electronic switch.

The first inductive storage element 21 is connected in series with the switching element 24 to form a first series circuit, wherein the first series circuit is connected between the input terminal 11 and the reference terminal 13. The second inductive storage element 23 is connected in series with the free-wheeling element 25 to form a second series circuit, wherein the second series circuit is connected between the output terminal 12 and the reference terminal 13. Further, the capacitive storage element 22 is connected between the first and second inductive storage elements 21, 23 so that the first inductive storage element 21, the capacitive storage element 22 and the second inductive storage element 23 are connected in series between the input terminal 11 and the output terminal 12.

The current source illustrated in FIG. 1 is suitable to provide an output current with a controllable mean value to a load, like, for example, to a light emitting diode (LED) arrangement Z (as illustrated in FIG. 1) but also to any other load which requires an approximately constant supply or load current. In the current source of FIG. 1, an input current of the current source equals a first current I1 through the first inductive storage element 21, and an output current of the current source equals a second current I2 through the second inductive storage element 23. The current direction of the output current I2 is as indicated in FIG. 1. The output current I2 flows from the output terminal 12 through the second inductive storage element 23. Consequently, an output voltage Vout, which is a voltage caused by the output current I2 at the load Z, is a negative voltage.

Figure 2:
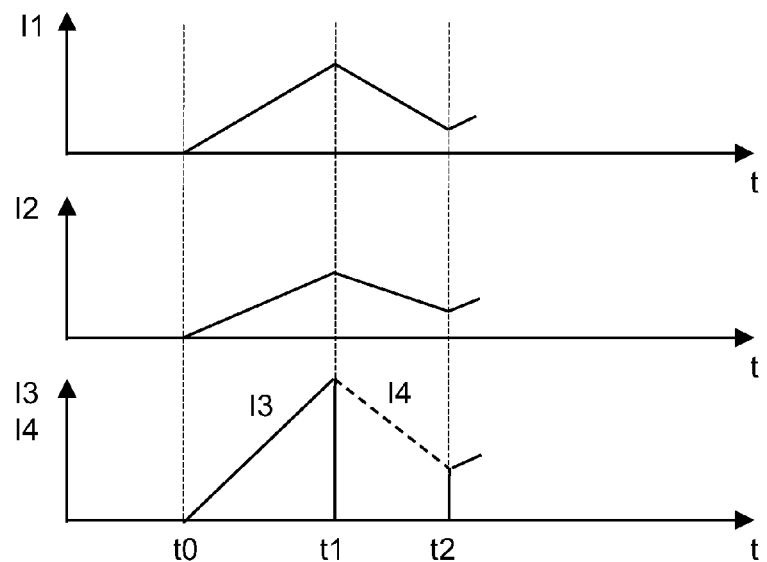
FIG. 2 illustrates the operating principle of the current source of FIG. 1 at start-up.
Figure 3:
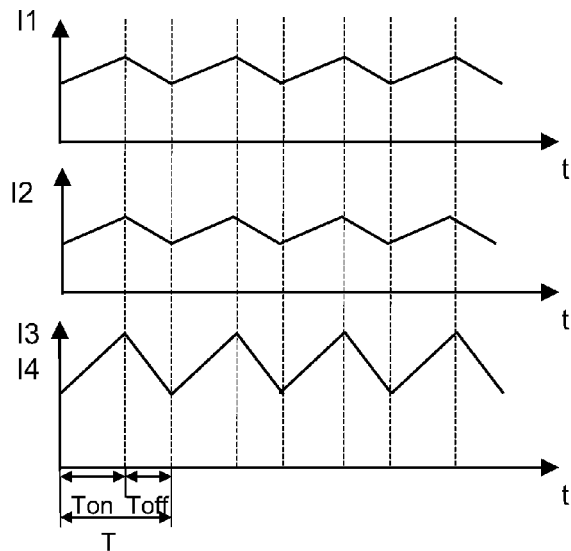
FIG. 3 illustrates the operating principle of the current source of FIG. 1 in steady-state.

The basic operating principle of the current source of FIG. 1 will now be explained with reference to FIGS. 2 and 3. In FIGS. 2 and 3 timing diagrams of the first current I1, the second current I2, a third current I3 (illustrated in solid lines) through the switching element 24, and a fourth current I4 (illustrated in dashed lines) through the free-wheeling element 25 are shown in a start-up phase (see FIG. 2) and in a steady phase (see FIG. 3). In FIG. 2, t0 denotes a time at which in a start-up phase of the current source the switching element 24 is switched on for the first time. For explanation purposes it is assumed that the input voltage Vin has been applied to the input terminal 11 before the first time t0. After the input voltage Vin has been applied to the input terminal 11 and before the first switching element 24 is switched on for the first time, the capacitive storage element 22 is charged until a voltage V22 across the capacitive storage element 22 equals the input voltage Vin. During this charging process an input current I1 flows through the first inductive storage element 21. For explanation purposes it is assumed that this charging process has been terminated before the first time to, so that the first current I1 is zero at the first time t0.

For explanation purposes it is further assumed that the first switching element 24 is switched on at the first time t0 and is switched off at a second time t1 later than the first time t0. When the first switching element 24 is switched on at the first time t0, the first current I1 increases linearly or approximately linearly. The increase (slope) of the first current I1 is dependent on the input voltage Vin and on an inductance L1 of the first inductive storage element follows:

$$\frac{dI1}{dt} = \frac{Vin}{L1}. \tag{1}$$

Before the first switching element 24 is switched on at the first time t0 the electrical potential at a circuit node 26 between the capacitive storage element 22, the second inductive storage element 23 and the free-wheeling element 25 is approximately equal to the reference potential GND. When the first switching element 24 is switched on at the first time t0 this potential at node 26 drops to a negative potential, wherein the absolute value of this negative potential equals the absolute value of the voltage V22 across the capacitive storage element 22 and, therefore, equals the absolute value of the input voltage Vin. This negative potential at circuit node 26 causes the second current I2 to increase linearly or approximately linearly, wherein an increase of this current I2 is dependent on the voltage across the capacitive storage element 22 and the voltage across the load Z.

When the switching element 24 is switched on, the fourth current I4 through the free-wheeling element 25 is zero and both, the first current I1 and the second current I2, flow through the switching element 24, so that the third current I3 is the sum of the first current I1 and the second current I2.

When the switching element 24 is switched off at the second time t1 the first current I1 continues to flow by virtue of the magnetic energy stored in the inductive storage element 21, and the second current I2 continues to flow by virtue of the magnetic energy stored in the second inductive storage element 23. The first current I1 flows into the capacitive storage element 22 and via the free-wheeling element 25 and recharges the capacitive storage element 22, and the second current I2 flows through the free-wheeling element 25. The first and second currents I1, I2 decrease linearly or approximately linearly after the switching element 24 has been switched off at time t1. The first and second currents I1, I2 decrease until the first switching element 24 is again switched on at a third time t2 when a new switching cycle starts.

According to one embodiment, the current source of FIG. 1 is operated in a continuous-current mode. In this continuous-current mode, the on-times and the off-times of the switching element 24 are adjusted such that neither the input current I1 nor the output current I2 decreases to zero. FIG. 3 illustrates timing diagrams of the first current I1, the second current I2 and the third and fourth currents I3, I4 in a steady-state of a Ćuk based current controller operated in continuous current mode. FIG. 3 illustrates two subsequent switching cycles of the switching element 24. In the embodiment illustrated in FIG. 3, these switching cycles each have a duration of T, wherein in each switching cycle the switching element 24 is switched on for an on-period Ton, and is switched off for an off-period Toff. In the steady-state the mean values of the first and second currents I1, I2 are constant, i.e., the start values from which the first and second currents I1, I2 start to increase at the beginning of the on-times equal the end values to which the first and second currents I1, I2 decrease at the end of the off-times.

The end value of the output current I2 can be increased by increasing the duty cycle for several switching cycles before the duty cycle is again adjusted to a value at which the current source operates in steady-state, and the mean value of the second current I2 can be decreased by decreasing the duty cycle for several switching cycles before the duty cycle is again adjusted to a value at which the current source operates in steady-state. The duty cycle D is the quotient Ton/T between the on-period Ton and the overall period T of one switching cycle, so that increasing the duty cycle D is equivalent to increasing the duration of the on-period Ton (at a given switching cycle period T), and decreasing the duty cycle is equivalent to decreasing the on-period Ton.

In a controlled current source, like the current source of FIG. 1, it is desired to adjust an output current (like the output current I2 of FIG. 1), or, more precisely, to adjust a mean value of an output current to a desired value. In the controlled current source of FIG. 1, the output current I2 can be adjusted by suitably adjusting a duty cycle of a switching operation of the switching element 24. In order to control the output current, the duty cycle can be adjusted dependent on the instantaneous output current I2 or the mean value of the instantaneous output current I2. Thus, adjusting the duty cycle of the switching operation of the switching element 24 requires information on the output current I2. The output current could be measured at the output terminal 12. However, this requires a current measurement circuit which operates at a floating potential, like the output potential of the current source. Measuring the output current I2 could include providing a shunt resistor through which the output current flows and evaluating a voltage drop across this resistor. However, due to the direction of the output current, the voltage to be evaluated would be a negative voltage relative to the reference potential. Processing positive and negative voltages in one integrated circuit is difficult so that this is another reason why it is difficult to measure the output current.

Figure 4:
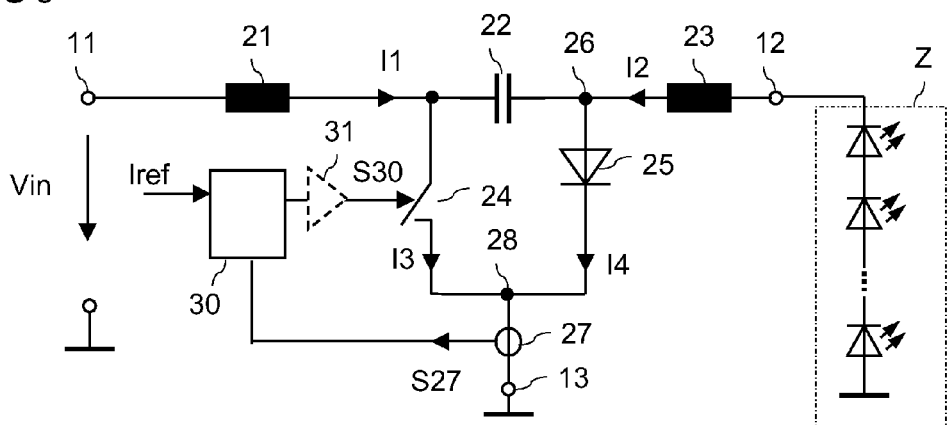
FIG. 4 illustrates a circuit diagram of a controlled current source with a Ćuk converter topology according to a first embodiment.

FIG. 4 illustrates a first embodiment of a current source based on the Ćuk topology illustrated in FIG. 1. The current source of FIG. 4 further includes a first current measurement circuit 27 connected between the reference terminal 13 and a circuit node 28 common to the switching element 24 and the free-wheeling element 25. The current between this circuit node 28 and the reference terminal 13 equals the sum of the third current I3 through the switching element 24 and the fourth current I4 through the free-wheeling element 25. The current measurement circuit 27 is configured to measure the current between the circuit node 28 and the reference terminal 13 and to provide a current measurement signal S27 which is dependent on this current I3+I4. According to one embodiment, the current measurement signal S27 is proportional to the current I3+I4. The current measurement circuit 27 can be implemented as a conventional current measurement circuit, like a current measurement circuit with a current mirror. Current measurement circuits are commonly known so that no further explanations are required in this regard.

The current source of FIG. 4, further includes a control circuit 30 which receives the current measurement signal S27 and a reference signal Iref. The reference signal represents the desired mean value of the output current I2. The control circuit 30 is configured to generate a pulse width-modulated (PWM) drive signal S30. The switching element 24 receives the pulse width-modulated (PWM) drive signal S30 at its control terminal. The drive signal S30 is configured to cyclically switch the switching element 24 on and off in order to adjust the output current I2 such that its mean value corresponds to the reference value Iref or is at least dependent on the reference value Iref.

Figure 5:
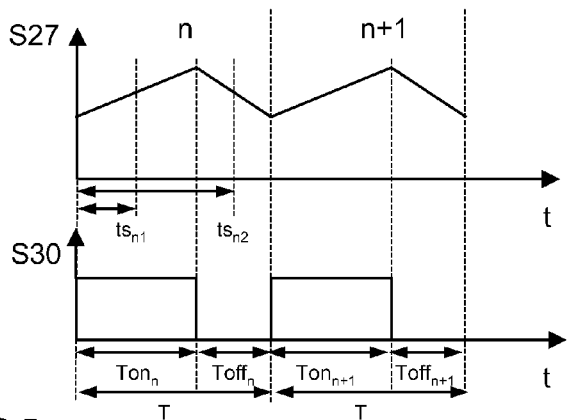
FIG. 5 shows timing diagrams to illustrate the operating principle of a control circuit of the current source of FIG. 4.

The operating principle of the control circuit 30 for generating the PWM drive signal S30 dependent on the current measurement signal S27 and the reference value Iref will be explained with reference to FIG. 5. FIG. 5 illustrates timing diagrams of the current measurement signal S27 and the drive signal S30 for two subsequent switching cycles. The control circuit 30 of FIG. 4 is configured to generate the drive signal S30 such that the individual switching cycles have the same duration T, wherein the control circuit 30 adjusts the duty cycle D and, therefore, the on-period Ton in each switching cycle dependent on the current measurement signal S27. The control circuit 30 is, for example, implemented as a digital circuit which internally generates a digital representation of the current measurement signal S27 processes the current measurement signal S27 and provides a digital drive signal S30 having either an on-level or an off-level. The switching element 24 is switched on when the drive signal S30 has an on-level, and the switching element 24 is switched off when the drive signal S30 has an off-level.

Optionally, a driver stage or amplifier stage 31 (illustrated in dashed lines) is connected between the control circuit 30 and the switching element 24. The amplifier stage 31 amplifies the output signal of the control circuit 30 to assume a signal level which is suitable for driving the switching element 24. The switching element 24 is, for example, implemented as a MOSFET, in particular an n-type MOSFET, an IGBT or a BJT.

The control circuit 30 is configured to calculate a mean value of the output current I2 based on the current measurement signal S27 during one switching cycle and to adjust the duty cycle of a following switching cycle dependent on the calculated mean value of the output current I2. FIG. 5 illustrates the timing diagrams for two switching cycles, a first switching cycle n and a subsequent second switching cycle n+1. $Ton_n$ denotes the on-period in the first switching cycle and $Ton_{n+1}$ denotes the on-period in the second switching cycle. The duty cycle of the first switching cycle is $D_n$ and the duty cycle of the second switching cycle $D_{n+1}$.

The control circuit 30 is configured to first determine the mean value of the current represented by the current measurement signal S27, which is the third current I3 through the switch 24 plus the fourth current I4 through the free-wheeling element 25. This current equals the current I3 through the switch 24 in the on-period and equals the current I4 through the free-wheeling element 25 in the off-period. In the steady-state the mean value $I2_m$ of the load current I2 equals the mean value $I4_m$ of the fourth current I4 through the free-wheeling element 25, and the mean value $I1_m$ of the input current I1 equals the mean value $I3_m$ of the third current I3 through the switch 24:

$$I2_m = I4_m \quad (2a)$$

$$I1_m = I3_m \quad (2b).$$

This is true because a mean value of a current through the capacitor 22 is zero. The current measurement signal S27 represents the sum I3+I4 of the third and fourth currents I3, I4, wherein the third current I3 is zero when the switching element 24 is switched off, and the fourth current I4 is zero when the switch is switched on.

The control circuit 30 is configured to sample the current measurement signal S27 and to determine the mean value $I2_m$ of the output current I2 based on at least one sample value obtained by sampling the current measurement signal S27.

According to one embodiment, the control circuit 30 samples the current measurement signal S27 either in the middle of the on-period or in the middle of the off-period. Since the information on the duty cycle $D_n$ in the first switching cycle n is available in the control circuit 30, the sampling times $ts_{n1}$, $ts_{n2}$ can easily be obtained as follows:

$$ts_{n1} = Ton_n \cdot 0.5 = Dn \cdot T \cdot 0.5 \quad (3a),$$

$$ts_{n2} = Ton_n + Toff_n \cdot 0.5 = (1+D_n) \cdot T \cdot 0.5 \quad (3b).$$

In equations (2a) and (2b) $ts_{n1}$ denotes the sampling time in the middle of the on-period, and $ts_{n2}$ denotes the sampling time in the middle of the off-period, wherein the first and second sampling times $ts_{n1}$, $ts_{n2}$ are times relative to the beginning of the switching cycle. Assume that $S27_{n1}$, $S27_{n2}$ are the sampling values obtained by sampling the current measurement signal S27 at the first or second sampling times $ts_{n1}$, $ts_{n2}$. These sampling values $S27_{n1}$, $S27_{n2}$ are equal in the steady state of the controller. For the integral of the current I4 through the free-wheeling element in one switching cycle with a duration T applies:

$$\int_0^T I4\, dt = a \cdot S27_{n1} \cdot (1-D_n) \cdot T = a \cdot S27_{n1} \cdot (1-D_n) \cdot T, \quad (4)$$

wherein $S27_{n1}$, $S27_{n2}$ denote the sample values and "a" denotes a proportionality factor between the current measurement signal S27 and the current I3+I4 through the current measuring device. From eqn. (4) the mean value $I4_m$ of the fourth current I4 and, therefore, the mean value $I2_m$ of output current I2 can be calculated as follows:

$$I2_m = a \cdot S27_{n1} \cdot (1-D_n) = a \cdot S27_{n2} \cdot (1-D_n) \quad (5)$$

wherein $I2_m$ denotes the mean value of the load current.

Figure 6:
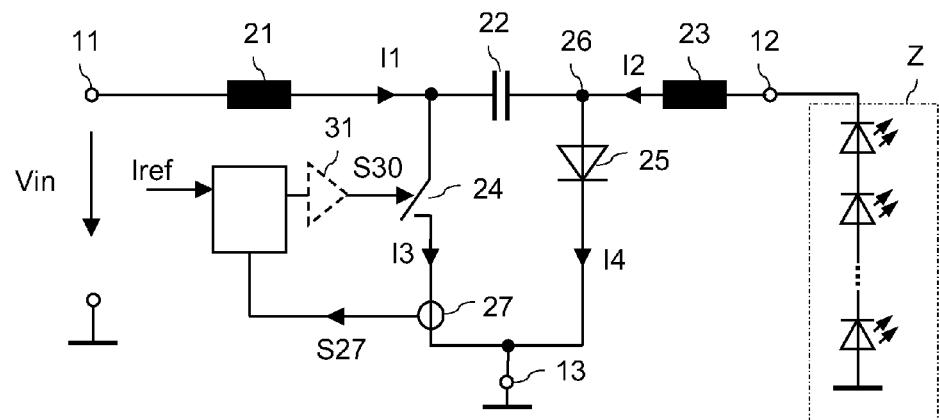
FIG. 6 illustrates a circuit diagram of a controlled current source with a Ćuk converter topology according to a second embodiment.
Figure 7:
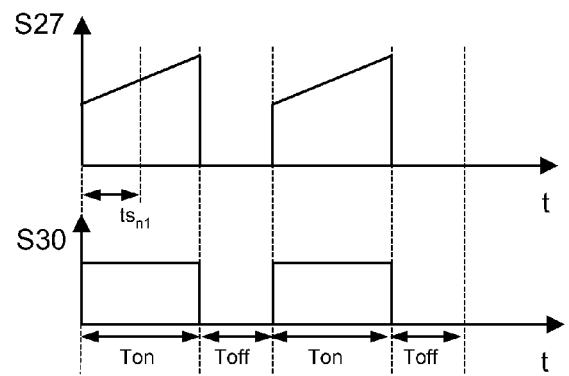
FIG. 7 shows timing diagrams to illustrate the operating principle of a control circuit of the current source of FIG. 6.

Since, referring to the explanation provided with reference to FIG. 5, the sampled value $S27_{n1}$ of the current through the switching element 24 and the sampled value $S27_{n2}$ of the current I4 through the free-wheeling diode 25 are equal, it would be sufficient to provide only one of the third and fourth currents I3, I4 to the control circuit 30. FIG. 6 illustrates an embodiment of a current source in which the first current measurement circuit 27 is only connected between the switching element 24 and the reference terminal 13, so that the current measurement signal S27 only represents the current I3 through the switching element 24. FIG. 7 illustrates the current measurement signal S27 of the current source of FIG. 6, wherein again timing diagrams during two subsequent switching cycles are illustrated. In this embodiment, the control circuit 30 samples the current measurement signal S27 at the first sampling time $ts_{n1}$ given by equation (2a). The mean value $I2_m$ of the load current I2 can be calculated from the sample value $S27_{n1}$ using equation (4). Dependent on the mean value $I2_m$ evaluated during the first switching cycle the duty cycle $D_{n+1}$ of the subsequent second switching cycle is adjusted dependent on the reference value Iref. Thus, $$D_{n+1} = f(Iref, S27_n) \quad (6).$$

Here, f(.) is a function implemented in the control circuit 30 to calculate the duty cycle $D_{n+1}$ dependent on the reference value Iref and the sample value $S27_n$, where $S27_n$ represents one of the sample values $S27_{n+1}$, $S27_{n2}$ explained hereinbefore.

Figure 8:
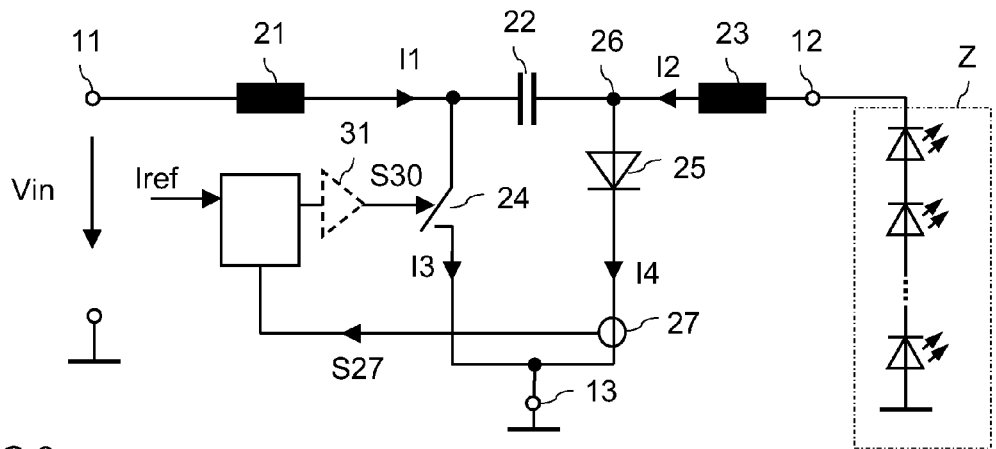
FIG. 8 illustrates a circuit diagram of a controlled current source with a Ćuk converter topology according to a third embodiment.
Figure 9:
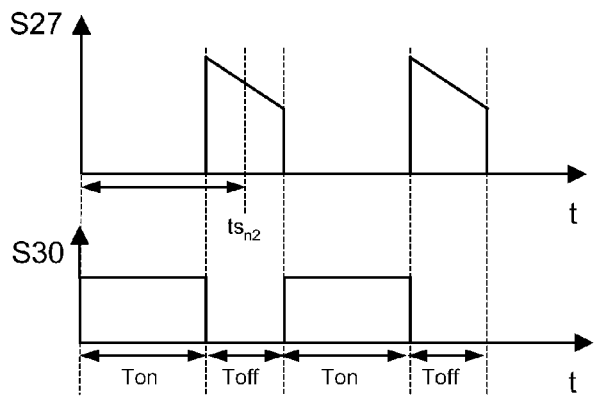
FIG. 9 shows timing diagrams to illustrate the operating principle of a control circuit of the current source of FIG. 8.

FIG. 8 illustrates a further embodiment of a current source. In this current source, the first current measurement circuit 27 is connected between the free-wheeling element 25 and the reference terminal 13, so that the current measurement signal S27 represents the fourth current I4 through the free-wheeling element 25. FIG. 9 illustrates the timing diagram of the current measurement signal S27 for two subsequent switching cycles. In this embodiment, the control circuit 30 is configured to sample the current measurement signal S27 at the second sample times $ts_{n2}$, i.e. in the middle of the off-period $Toff_n$. Referring to what has explained hereinbefore, the mean value $I2_m$ of the load current I2 can be obtained from the sampling value $S27_{n2}$ using equation (5). The duty cycle $D_{n+1}$ of the next switching cycle can be calculated using equation (6).

According to further embodiments, the control circuit 30 is configured to determine the output current I2 from the input current I1 and the sum I3+I4 of the third and fourth currents I3, I4 as follows:

$$I2 = I3 + I4 - I1 \quad (7),$$

wherein the sum I3+I4 can be obtained by providing a current measurement circuit 27 which is connected as illustrated in FIG. 4, and wherein I1 can be obtained by measuring the input current.

The control circuit 30 explained with reference to FIGS. 4 to 9 can be implemented as a digital circuit. In this case, the duty cycle $D_{n+1}$ of a next switching cycle is calculated mathematically in accordance with eqn. (5).

Figure 10:
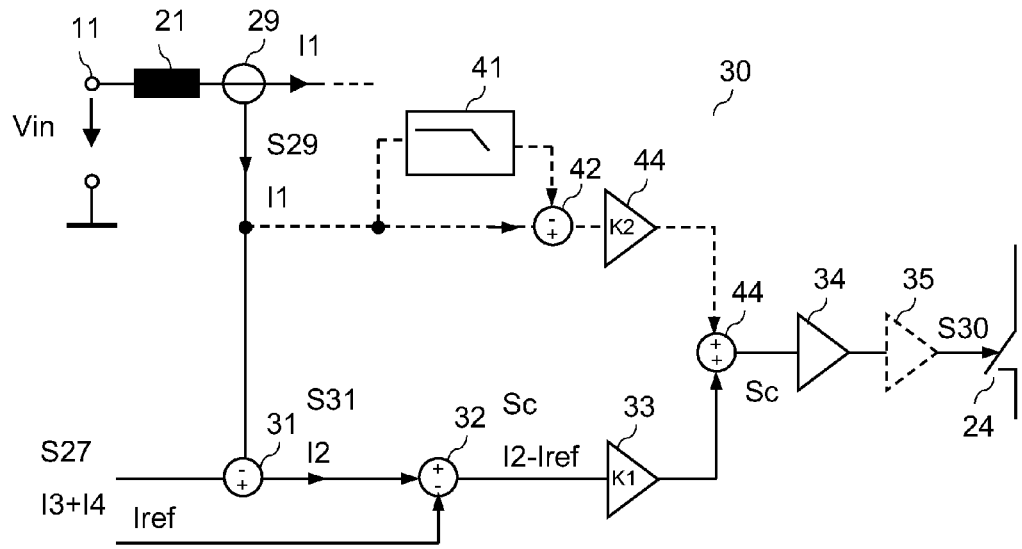
FIG. 10 illustrates a further embodiment of a control circuit of the current source of FIG. 4.

However, the control circuit 30 can also be implemented as an analog circuit. In this case, the duty cycle is "automatically" adjusted to a value at which the current source operates in the steady state. FIG. 10 illustrates a first embodiment of a control circuit 30 for the current source of FIG. 4 which can be implemented as an analog circuit. In this control circuit 30 the output current is calculated in accordance with equation (6). This control circuit 30 includes a second current measurement circuit 29 which is configured to measure the input current I1 and to provide a current measurement signal S29 which represents the input current I1. The first current measurement signal S27 represents the sum of the currents I3, I4 through the switching element 24 and the free-wheeling element 25 and can be obtained as illustrated in FIG. 4. In FIG. 10, besides the current measurement signals S27, S29 the currents I1, I3+I4 represented by these current measurement signals are also indicated. For explanation purposes it will be assumed in the following that a proportionality factor between S27 and I3+I4 and S29 and I1, respectively, is 1, so that in the following explanation and the corresponding equations I3+I4 is equivalent to S27 and I1 is equivalent to S29. If the proportionality factors are not 1, the proportionality factors have to be taken into account in a commonly known manner.

The control circuit 30 of FIG. 10 is configured to generate a control signal Sc which represents a difference between the load (output) current I2 and a reference value Iref. For this, the control circuit 30 includes a first calculating element 31 which subtracts second the current measurement signal S29 representing the input current I1 from the first current measurement signal S27 representing the sum I3+I4 of the currents through the switch 23 and the free-wheeling element 25, wherein this sum I3+I4 is equal to the sum of the input current I1 and the output current I2. An output signal S31 of the first calculating element 31 represents the load current I2. A second calculating element 32 subtracts the reference value Iref from this signal S31 representing the output current I2. The control signal Sc represents the difference between the output current I2 and the reference current Iref. This control signal Sc is provided to a hysteretic controller 34 which generates the drive signal S30. An amplifier 35 is optionally connected between the output of the hysteretic controller 34 and the switching element 24. The hysteretic controller 34 is, for example, implemented as a Schmitt trigger. Optionally, the control signal Sc is multiplied with a first coefficient K1 by weighting element 33 before providing the control signal Sc to the controller 34.

In this controller the drive signal S30 and, in particular the duty cycle of the drive signal S30 is controlled such that $K2 \cdot (I2-Iref) = 0$.

According to a further option (illustrated in dashed lines in FIG. 10), the control signal Sc is also dependent on a difference between the input current I1 and a mean value $I1_m$ of the input current I1 according to $$Sc = K1 \cdot (I2 - Iref) + K2 \cdot (I1 - I1_m) \qquad (8),$$

where $I1_m$ denotes the mean value of the input current I1 and K2 is an optional weighting factor. The input current mean value $I1_m$ is calculated by a mean value calculation unit 41 which receives the input current signal S29. A calculation unit 42 calculates the difference between the input current I1 and the corresponding mean value $I1_m$, wherein this difference is weighted by a further weighting unit 44 with weighting factor K2. In this embodiment, the control signal Sc is available at the output of a further calculation unit which receives the weighted difference $K1 \cdot (I2-Iref)$ at a first input and the weighted difference $K2 \cdot (I1-I1_m)$ at a second input. Taking into account the input current I1 into the generation of the drive signal and, therefore into the control of the load current I2 provided by the controller current source adds to the stability of the controller.

Figure 11:
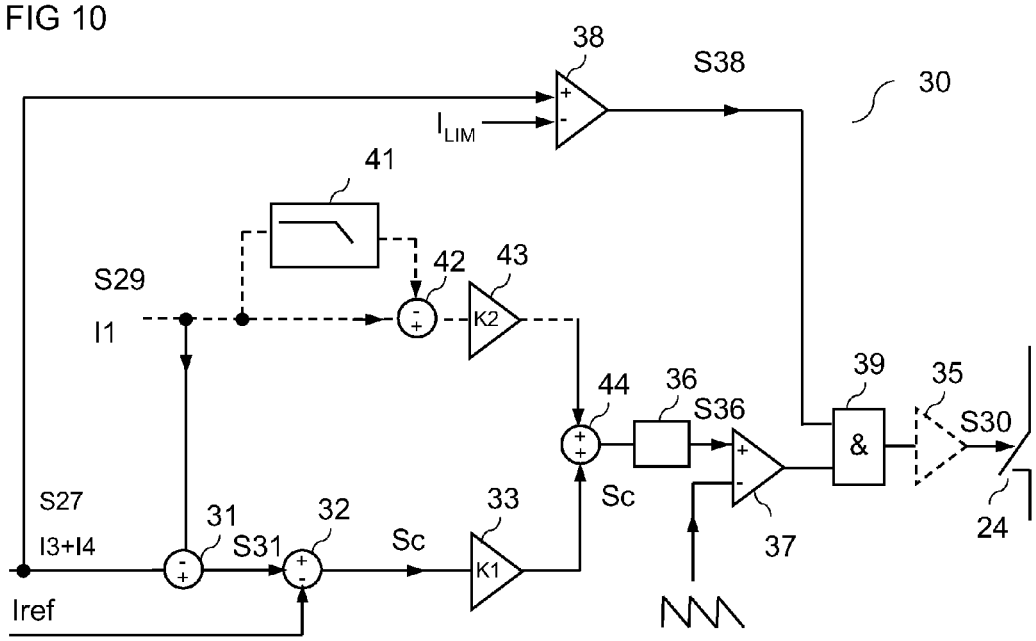
FIG. 11 illustrates yet another embodiment of a control circuit of the current source of FIG. 4.

According to a further embodiment illustrated in FIG. 11, the control signal Sc is provided to a controller 36 which, for example, has a proportional (P) controller characteristic, or a proportional-integrating (PI) controller characteristic. At the output of the controller 36 a modified control signal S36 is available which is compared with a periodic signal, like a sawtooth signal by a comparator 37. The drive signal S30 is available at the output of the comparator 37, wherein the drive signal S30 has an on-level each time the control signal Sc is higher than the sawtooth signal, and has an off-level each time the control signal is lower than the sawtooth signal.

Optionally, the controller 30 of FIG. 11 includes a current limiting circuit which switches off the switching element 24 each time the overall current, i.e. the sum of the input current I1 and the output current I2 reaches a current limiting $I_{LIM}$. A comparator 38 compares the first measurement signal S27 representing the sum I3+I4 with a reference current value $I_{LIM}$ and switches off the switching element 24 each time the first measurement signal S27 reaches the reference current value $I_{LIM}$. In this case, the drive signal S30 is available at the output of an AND-gate 38 which receives an output signal S38 of the comparator 38 and the output signal of the comparator 37 at its input terminals and which provides a drive signal S30 at its output terminal.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A controlled current source, comprising:
   an input terminal configured to receive an input voltage;
   an output terminal configured to have a load connected thereto;
   a reference terminal configured to have a reference potential applied thereto;
   a first inductive storage element and a switching element connected in series, a series circuit with the first inductive storage element and the a switching element being connected between the input terminal and the reference terminal;
   a second inductive storage element and a free-wheeling element connected in series, a series circuit with the second inductive storage element and the free-wheeling element being connected between the output terminal and the reference terminal;
   a capacitive storage element coupled between the first and second inductive storage element such that the first inductive storage element, the capacitive storage element and the second inductive storage element are connected in series between the input terminal and the output terminal;
   a first current measurement circuit comprising a current measurement output, the first current measurement circuit configured to measure one of a current through the switching element, through the free-wheeling element, or a sum of the currents through the switching element and the free-wheeling element to provide a first current measurement signal at the current measurement output that is dependent on the measured current; and
   a control circuit having an input coupled to the current measurement output of the current measurement circuit, the control circuit configured to:
      generate a drive signal so as to have subsequent switching cycles, and to generate the drive signal so as to switch on the switching element for an on-time and to switch off the switching element for an off-time in each switching cycle, and
      sample the first current measurement signal at a sample time that is during at least one of the on-time and the off-time to obtain a discrete-time sample value in a first switching cycle, and to generate the drive signal for the switching element in a subsequent switching cycle dependent on the discrete-time sample value sampled during the first switching cycle.

2. The controlled current source of claim 1,
wherein the drive signal is a pulse width modulated drive signal having a duty cycle, and
wherein the control circuit is configured to adjust the duty cycle dependent on the discrete-time sample value.

3. The controlled current source of claim 1,
wherein the first current measurement circuit is configured to measure the sum of the currents through the switching element and the free-wheeling element,
wherein the controlled current source further comprises a second current measurement circuit configured to measure a current through the first inductive storage element and to provide a second current measurement signal which is dependent on the measured current through the first inductive storage element, and
wherein the control circuit is configured to generate a signal representing the current through the second inductive storage element from the first and the second current measurement signals to compare this signal representing the current through the second inductive storage element with a reference current value to produce a comparison result, and to generate the drive signal dependent on the comparison result.

4. The controlled current source of claim 3, wherein the control circuit is configured
to generate a control signal which is dependent on a difference between the first current measurement signal, the second current measurement signal and the reference current value, and
to generate the drive signal dependent on the control signal.

5. The controlled current source of claim 4, wherein the control circuit comprises a hysteretic controller configured to receive the control signal and to generate the drive signal dependent on the control signal.

6. The controlled current source of claim 4, wherein the control circuit comprises:
a controller configured to receive the control signal and to generate a modified control signal; and
a pulse width modulator configured to receive the modified control signal and to generate the drive signal with a duty cycle which is dependent on the modified control signal.

7. The controlled current source of claim 6, wherein the controller has a PI-characteristic.

8. A controlled current source, comprising:
an input terminal configured to receive an input voltage;
an output terminal configured to have a load connected thereto;
a reference terminal configured to have a reference potential applied thereto;
a first inductive storage element and a switching element connected in series, a series circuit with the first inductive storage element and the a switching element being connected between the input terminal and the reference terminal;
a second inductive storage element and a free-wheeling element connected in series, a series circuit with the second inductive storage element and the free-wheeling element being connected between the output terminal and the reference terminal;
a capacitive storage element coupled between the first and second inductive storage element such that the first inductive storage element, the capacitive storage element and the second inductive storage element are connected in series between the input terminal and the output terminal;
a first current measurement circuit configured to measure one of a current through the switching element, through the free-wheeling element, or a sum of the currents through the switching element and the free-wheeling element to provide a first current measurement signal which is dependent on the measured current; and
a control circuit configured to sample the first current measurement signal to obtain a sample value, and to generate a drive signal for the switching element dependent on the sample value,
wherein the drive signal is a pulse width modulated drive signal having a duty cycle,
wherein the control circuit is configured to adjust the duty cycle dependent on the sample value, and
wherein the control circuit is configured
to generate the drive signal so as to have subsequent switching cycles, and
to generate the drive signal so as to switch on the switching element for an on-time and to switch off the switching element for an off-time in each switching cycle,
to sample the first current measurement signal at least once during the on-time or the off-time of a first switching cycle to obtain the sample value, and
to adjust the duty cycle of a switching cycle subsequent to the first switching cycle, wherein the duty cycle is adjusted dependent on the sample value sampled during the first switching cycle.

9. The controlled current source of claim 8, wherein the control circuit is further configured to sample the first current measurement signal during the on-time at a fixed time relative to a duration of the on-time.

10. The controlled current source of claim 8, wherein the control circuit is further configured to sample the first current measurement signal during the off-time at a fixed time relative to a duration of the off-time.

11. The controlled current source of claim 8, wherein the control circuit is further configured
to calculate a mean value of a current through the second inductive storage element from at least one sample value,
to compare the calculated mean value with a reference current value to produce a comparison result, and
to adjust the duty cycle based on the comparison result.

12. The controlled current source of claim 9, wherein the fixed time occurs in a middle of the on-time.

13. The controlled current source of claim 10, wherein the fixed time occurs in a middle of the off-time.

14. The controlled current source of claim 11, wherein the control circuit is further configured
to increase the duty cycle when the calculated mean value is below the reference current value, and
to decrease the duty cycle when the calculated mean value is above the reference current value.

15. The controlled current source of claim 14, wherein the controlled current source is further configured
to calculate a further mean value of a current through the first inductive storage element from the at least one sample value, and
to adjust the duty cycle based on the calculated further mean value.

16. A control circuit for a switching element in a controlled current source, the current source comprising:
an input terminal configured to receive an input voltage, an output terminal configured to have a load connected thereto, and a reference terminal configured to have a reference potential applied thereto;
a first inductive storage element and a switching element connected in series, a series circuit with the first inductive storage element and the a switching element connected between the input terminal and the reference terminal;

a second inductive storage element and a free-wheeling element connected in series, a series circuit with the second inductive storage element and the free-wheeling element connected between the output terminal and the reference terminal;

a capacitive storage element coupled between the first and second inductive storage element such that the first inductive storage element, the capacitive storage element and the second inductive storage element are connected in series between the input terminal and the output terminal; and a first current measurement circuit comprising a current measurement output, the first current measurement circuit configured to measure one of a current through the switching element, through the free-wheeling element, or a sum of the currents through the switching element and the free-wheeling element to provide a first current measurement signal at the current measurement output that is dependent on the measured current, wherein the control circuit comprises an input configured to be coupled to the current measurement output of the current measurement circuit, and the control circuit is configured to:

generate a drive signal so as to have subsequent switching cycles, wherein the drive signal is generated to switch on the switching element for an on-time and to switch off the switching element for an off-time in each switching cycle, sample the first current measurement signal at a sample time that is during at least one of the on-time and the off-time to obtain a discrete-time sample value in a first switching cycle, and to generate the drive signal for the switching element in a subsequent switching cycle dependent on the discrete-time sample value sampled during the first switching cycle.

17. A method for operating a circuit that comprises an input terminal configured to receive an input voltage, an output terminal configured to have a load connected thereto, and a reference terminal configured to have a reference potential applied thereto; a first inductive storage element and a switching element connected in series, a series circuit with the first inductive storage element and the a switching element connected between the input terminal and the reference terminal; a second inductive storage element and a free-wheeling element connected in series, a series circuit with the second inductive storage element and the free-wheeling element connected between the output terminal and the reference terminal; a capacitive storage element coupled between the first and second inductive storage element such that the first inductive storage element, the capacitive storage element and the second inductive storage element are connected in series between the input terminal and the output terminal, the method comprising:

measuring one of a current through the switching element, through the free-wheeling element, or a sum of the currents through the switching element and the free-wheeling element to provide a first current measurement signal that is dependent on the measured current;

generating a drive signal to have subsequent switching cycles, and to switch on the switching element for an on-time and to switch off the switching element for an off-time in each switching cycle; and sampling the first current measurement signal at a sample time that is during at least one of the on-time and the off-time to obtain a discrete-time sample value in a first switching cycle, wherein the generating the drive signal in a subsequent switching cycle is dependent on the discrete-time sample value sampled during the first switching cycle.

\* \* \* \* \*